United States Patent
Wang et al.

(10) Patent No.: US 9,740,346 B2
(45) Date of Patent: Aug. 22, 2017

(54) TOUCH SCREEN, MANUFACTURING METHOD THEREOF AND DISPLAY DEVICE

(71) Applicants: BOE Technology Group Co., Ltd., Beijing (CN); Chengdu BOE Optoelectronics Technology Co., Ltd., Sichuan (CN)

(72) Inventors: Benlian Wang, Beijing (CN); Xiaojing Qi, Beijing (CN); Feng Bai, Beijing (CN); Zhiqin Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

(*) Notice: Subject to any disclaimer, the term of this patent is extended or adjusted under 35 U.S.C. 154(b) by 148 days.

(21) Appl. No.: 14/647,543

(22) PCT Filed: Sep. 26, 2014

(86) PCT No.: PCT/CN2014/087522
§ 371 (c)(1),
(2) Date: May 27, 2015

(87) PCT Pub. No.: WO2015/196605
PCT Pub. Date: Dec. 30, 2015

(65) Prior Publication Data
US 2015/0370367 A1 Dec. 24, 2015

(30) Foreign Application Priority Data
Jun. 24, 2014 (CN) .......................... 2014 1 0285714

(51) Int. Cl.
*G06F 3/045* (2006.01)
*G06F 3/044* (2006.01)
*G06F 1/16* (2006.01)

(52) U.S. Cl.
CPC ................ *G06F 3/044* (2013.01); *G06F 1/16* (2013.01); *G06F 2203/04103* (2013.01)

(58) Field of Classification Search
None
See application file for complete search history.

(56) References Cited

U.S. PATENT DOCUMENTS

2008/0150906 A1* 6/2008 Grivna .................. G06F 3/0416
345/173
2008/0278178 A1* 11/2008 Philipp .................. G06F 3/044
324/662

(Continued)

FOREIGN PATENT DOCUMENTS

CN 101655758 A 2/2010
CN 102004572 A 4/2011

(Continued)

OTHER PUBLICATIONS

International Search Report and Written Opinion for PCT Application No. PCT/CN2014/087522 including English translation of Written Opinion, dated Mar. 23, 2015, 15 pages.

(Continued)

*Primary Examiner* — Christopher R Lamb
(74) *Attorney, Agent, or Firm* — Westman, Champlin & Koehler, P.A.

(57) ABSTRACT

A touch screen, a manufacturing method thereof and a display device are disclosed. In the touch screen, a plurality of first sensing units are connected to each other by a first connection line in a first direction; and a plurality of second sensing units are connected to each other by a second connection line in a second direction; the first sensing units and the second sensing units are arranged alternatively in the first and second direction; and in the first direction, at least part of the second sensing units is overlapped with the first connection line between two first sensing units adjacent to (Continued)

this second sensing unit, and in the second direction, at least part of the first sensing units is overlapped with the second connection line between two second sensing units adjacent to this first sensing unit. The overlapping area between the first sensing unit and the respective connection line and the overlapping area between the second sensing unit and the respective connection line is increased, improving the electrostatic capacitance in the overlapping position, and in turn improving the ability of anti-static electricity of the touch screen.

18 Claims, 7 Drawing Sheets

(56) References Cited

U.S. PATENT DOCUMENTS

| | | | |
|---|---|---|---|
| 2010/0134436 A1 | 6/2010 | Jeong et al. | |
| 2011/0050625 A1* | 3/2011 | Kim | G06F 3/044 345/174 |
| 2012/0098762 A1* | 4/2012 | Kim | G06F 3/044 345/173 |
| 2012/0194474 A1* | 8/2012 | Chang | G06F 3/044 345/174 |
| 2013/0279063 A1* | 10/2013 | Yoo | H05F 3/00 361/220 |
| 2014/0098304 A1* | 4/2014 | Kim | G06F 3/044 349/12 |
| 2014/0347299 A1* | 11/2014 | Lu | G06F 3/044 345/173 |

FOREIGN PATENT DOCUMENTS

| | | |
|---|---|---|
| CN | 102455820 A | 5/2012 |
| CN | 102870073 A | 1/2013 |
| CN | 103677410 A | 3/2014 |
| CN | 103677461 A | 3/2014 |
| KR | 10-2009-0058072 A | 6/2009 |

OTHER PUBLICATIONS

First Office Action, including Search Report, for Chinese Patent Application No. 201410285714.1, dated Jul. 4, 2016, 19 pages.

* cited by examiner

TOUCH SCREEN, MANUFACTURING METHOD THEREOF AND DISPLAY DEVICE

CROSS-REFERENCE TO RELATED APPLICATION

This Application is a Section 371 National Stage Application of International Application No. PCT/CN2014/087522, filed 26 Sep. 2014, which has not yet published, and claims priority to Chinese Patent Application No. 201410285714.1, filed on 24 Jun. 2014, in Chinese, the contents of which are hereby incorporated by reference in their entirety.

BACKGROUND OF THE INVENTION

Field of the Invention

Embodiments of the present invention relate to a touch screen of a display device, more particularly, relates to a touch screen, a manufacturing method thereof and a display device including the same.

Description of the Related Art

A touch panel is an input device, which allows to input user's instructions therein by selecting the instruction contents displayed on a screen, such as an image display device, by means of a finger of the user or an object. Generally, the touch panel is provided in front of the image display device so as to transfer a contact position into an electrical signal. In this way, the finger of the user or the object directly comes into contact with the touch panel at the contact position. Therefore, the instruction content selected at the contact position is inputted into the image display device as an input signal. Since such touch panel has been used to replace a separate input device (for example, a keyboard or a mouse) connected to the image display device, the touch panel has been widely used in many areas.

The touch panel is divided into: resistive touch panel, photosensitive touch panel and capacitive touch panel and so on. In the capacitive touch panel, when the finger of the user or the object comes into contact with the touch panel, the contact position is transferred into the electrical signal by sensing the changes of the capacitances formed between a conductive sensing pattern and another sensing pattern adjacent to the conductive sensing pattern, a ground electrode and the like. In order to determine the exact contact position on a contact surface of the touch panel, as shown in FIG. 1, the sensing patterns include a plurality of first sensing units 101 arranged in a first direction and connected to each other, and a plurality of second sensing units 102 arranged in a second direction and connected to each other. Each first sensing unit is connected to another first sensing unit by a first connection line 103, and each second sensing units is connected to another second sensing unit by a second connection line 104. In further, the first connection line is insulated from and intersected with the second connection line.

Since the first sensing unit and the second sensing unit of the touch panel are generally both made of ITO (Indium tin oxide) material having high-resistance, a great deal of static electricity is readily accumulated during the manufacture thereof. Further, since the overlapping area of the first connection line and the second connection line is relatively small and the resistance thereof is larger than that of the patter of the sensing unit, while the thickness of an insulated layer in the overlapping portion provided between the first connection line and the second connection line is relatively thin due to the limitation of the forming process of the thin film, the overlapping area between the first connection line and the second connection line readily renders electrostatic capacitance every small, and is apt to be damaged due to the static electricity and causes failure of the touch panel.

SUMMARY OF THE INVENTION

In view of this, a touch screen, embodiments of the present invention provide a touch panel and a manufacturing method thereof and a display device, so as to avoid failure of touch panel caused by excessively small electrostatic capacitance of overlapping areas between connection lines of the touch panel.

According to embodiments of the first aspect of the present invention, there is provided a touch screen, comprising:

a plurality of first sensing units connected to each other by a first connection line in a first direction; and a plurality of second sensing units connected to each other by a second connection line in a second direction, wherein, the first sensing units and the second sensing units are arranged alternatively in the first and second direction' and in the first direction, at least part of the second sensing units is overlapped with the first connection line between two first sensing units adjacent to this second sensing unit, and in the second direction, at least part of the first sensing units is overlapped with the second connection line between two second sensing units adjacent to this first sensing unit.

In an embodiment, the first connection line is overlapped with an edge of the second sensing unit, and the second connection line is overlapped with an edge of the first sensing unit.

In an embodiment, the first connection line is provided with a plurality of groups of first branch lines, each group of first branch lines including at least one first branch line, and the first branch line of each group of first branch lines being overlapped with the respective second sensing unit which is overlapped with the first connection line; and/or the second connection line is provided with a plurality of groups of first branch lines, each group of second branch lines including at least one second branch line, and the second branch line of each group of second branch lines being overlapped with the respective first sensing unit which is overlapped with the second connection line.

In an embodiment, the first branch line is led out from the first connection line and extends in the second direction; and the second branch line is led out from the second connection line and extends in the first direction.

In an embodiment, the first branch line is overlapped with an edge of the second sensing unit, and the second branch line is overlapped with an edge of the first sensing unit.

In an embodiment, the width of the first branch line is less than that of the first connection line, and the width of the second branch line is less than that of the second connection line.

In an embodiment, the first sensing units and the second sensing units both are rhombus-shaped, the first connection line is led out from a first edge of the first sensing unit, the second connection line is led out from a second edge of the second sensing unit, and the intersection angle between extension lines of the first edge and the second edge is equal to one angle of the rhombus.

In an embodiment, the first sensing units and the second sensing units are formed in different layers, the first sensing units and the first connection lines are formed in the same layer, and the second sensing units and the second connection lines are formed in the same layer.

According to embodiments of the second aspect of the present invention, there is provided a display device, comprising the touch screen mentioned above.

According to embodiments of the third aspect of the present invention, there is provided a manufacturing method of a touch screen, comprising steps of:

forming a first sensing unit material layer, and pattering the first sensing unit material layer so as to form a plurality of first sensing units and a plurality of first connection lines, the plurality of the first sensing units being connected to each other by the first connection line in a first direction;

coating an insulation layer over the first sensing units and the first connection lines;

forming a second sensing unit material layer, and pattering the second sensing unit material layer so as to form a plurality of second sensing units and a plurality of second connection lines, the plurality of the second sensing units being connected to each other by the second connection line in a second direction;

wherein, in the first direction and the second direction, the first sensing units and the second sensing units are arranged alternatively; and in the first direction, at least part of the second sensing units is overlapped with the first connection line between two first sensing units adjacent to this second sensing unit, and in the second direction, at least part of the first sensing units is overlapped with the second connection line between two second sensing units adjacent to this first sensing unit.

In an embodiment, the step of forming the first sensing unit material layer and pattering the first sensing unit material layer comprises a step of:

forming a plurality groups of first branch lines, each group of the first branch lines including at least one first branch line, being led out from the first connection line and formed under the respective second sensing unit.

In an embodiment, the step of forming the second sensing unit material layer and pattering the second sensing unit material layer comprises a step of:

forming a plurality of groups of second branch lines, each group of the second branch lines including at least one second branch line, being led out from the second connection line and formed under the respective first sensing unit.

In the above solution provided by the present invention, the first connection line for connecting the first sensing units is overlapped with the second sensing units, and the second connection line for connecting the second sensing units is overlapped with the first sensing unit so as to increase the overlapping area between the first sensing unit and the respective connection line and the overlapping area between the second sensing unit and the respective connection line. Meanwhile, the first branch lines and the second branch lines are further led out from the first connection line and the second connection line, respectively so as to increase the overlapping capacitance therebetween, improve the electrostatic capacitance in the overlapping position, and in turn improve the ability of anti-static electricity.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
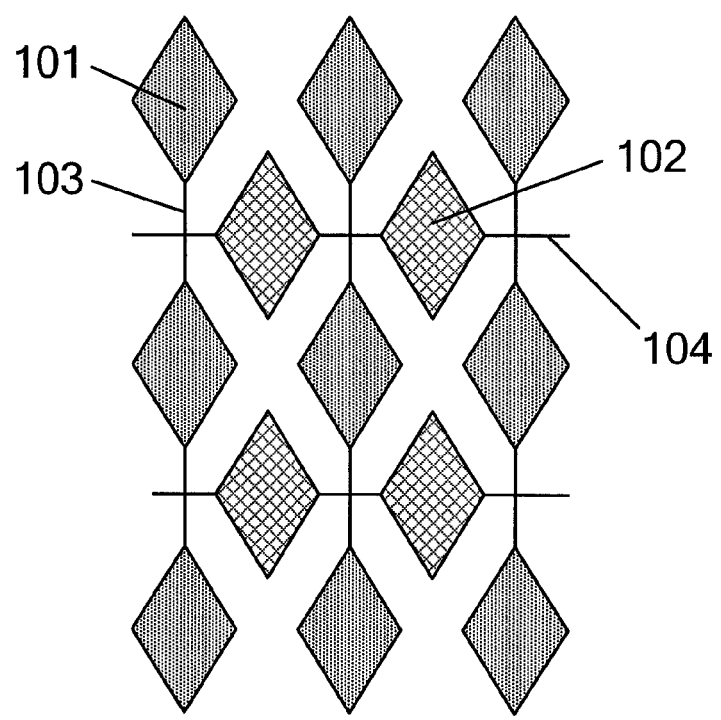
FIG. 1 is a principal schematic view of a touch screen in the prior art.
Figure 2:
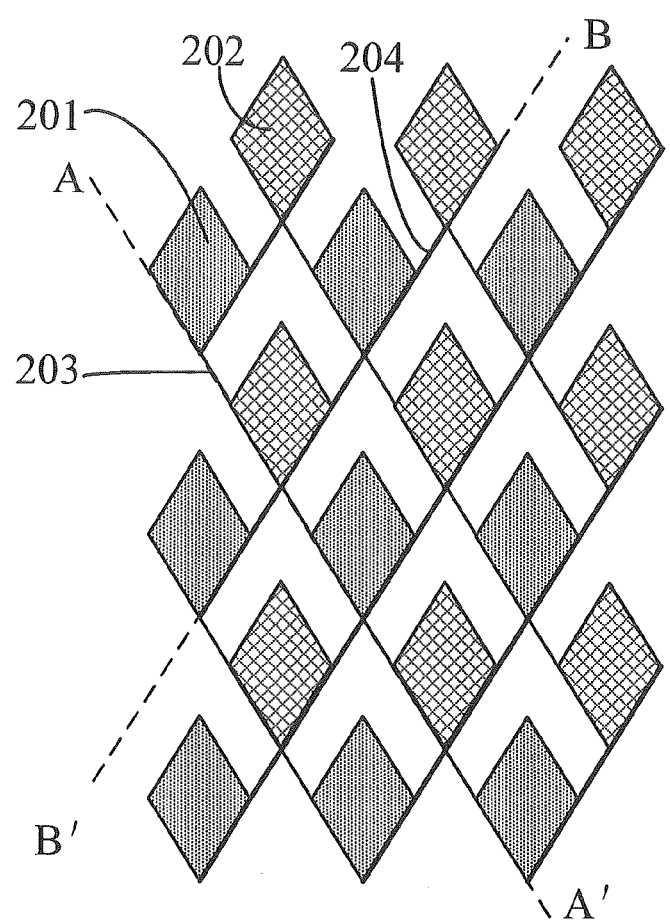
FIG. 2 is a principal schematic view of arrangement of sensing units in a touch screen according to a first embodiment of the present invention.

In order to completely understand the object, technical solution and advantages of the present invention, exemplary embodiments of the present disclosure will be described hereinafter in detail with reference to the attached drawings. FIG. 2 is the principal schematic view of arrangement of sensing units in a touch screen according to the first embodiment of the present invention. As shown in FIG. 2, the touch screen includes: a plurality of first sensing units 201 connected to each other by a first connection line 203 in a first direction AA'; and a plurality of second sensing units 202 connected to each other by a second connection line 204 in a second direction BB'. The first sensing units 201 and the second sensing units 202 are arranged alternatively in the first and second directions, and in the first direction, at least part of one second sensing units 202 is overlapped with the first connection line 203 between two first sensing units 201 adjacent to said one second sensing unit 202; and in the second direction, at least part of one first sensing units 201 is overlapped with the second connection line 204 between two second sensing units 202 adjacent to said one first sensing unit 201.

In an exemplary embodiment, a plurality of the first sensing units 201 are arranged with an interval in the first direction and connected to each other by the first connection line 203. A plurality of the second sensing units 202 are located at the intervals among a plurality of the first sensing units 201, respectively, and are arranged in the second direction and connected to each other by the second connection line 204. Each of the first sensing units 201 is spaced apart from the adjacent second sensing units 202.

Preferably, the first sensing units 201 and the second sensing units 202 are both formed as polygon with the same size and shape, such as quadrangle, hexagon and the like, or irregular shape.

In an exemplary embodiment, the first connection line 203 and the second connection line 204 are led out from arbitrary positions of the first sensing units 201 and the second sensing units 202, respectively, as long as the first connection line 203 is overlapped with at least part of the second sensing units 202, and the second connection line 204 is overlapped with at least part of the first sensing units 201. For instance, the first connection line 203 and the second connection line 204 are led out from an edge of the first sensing units 201 and an edge of the second sensing units 202, respectively, and are overlapped with edge regions of the second sensing units 202 and edge regions of the first sensing units 201, respectively. In this way, the overlap enhances the ability of anti-static electricity of the touch panel.

In an exemplary embodiment, each first sensing unit 201 is overlapped with the second connection line 204, and each second sensing unit 202 is overlapped with the first connection line 203.

In above embodiment, the first and second directions are arbitrary directions with a certain angle therebetween, for example, two directions with an intersection angle less than 90 degree, or two directions perpendicular to each other.

As shown in FIG. 2, the first sensing units 201 and the second sensing units 202 of the first embodiments of the present invention are both formed as rhombus-shaped, and the first connection line 203 is led out from a first side of the first sensing unit 201, and the second connection line 204 is led out from a second side of the second sensing unit 202, and the intersection angle between extension lines of the first side and the second side is substantially equal to one angle of the rhombus. An side region of the second sensing unit 202, in which a side is intersected with the second side with an intersection angle equal to the above the one angle, is overlapped with the first connection line 203; and an side region of the first sensing unit 201, in which a side is intersected with the first side with an intersection angle equal to the one angle, is overlapped with the second connection line 204. As a whole, the first sensing units 201 and the second sensing units 202 are alternatively distributed in the first and second directions, respectively. Each first sensing units 201 is located between two adjacent second sensing units 202 arranged in the first direction, and an edge region of the first sensing unit 201 is overlapped with the second connection line 204 for connecting the two second sensing units 202; similarly, each second sensing units 202 is located between two adjacent first sensing units 201 arranged in the second direction, and an edge region of the second sensing units 202 is overlapped with the first connection line 203 for connecting the two first sensing units 201. The first direction and the second direction are such directions, respectively, in which the first connection line 203 is led out from one edge of the rhombus and the second connection line 204 is led out from another edge of the rhombus. Of course, when the first sensing unit and the second sensing unit are rhombus-shaped respectively, the first connection line 203 and the second connection line 204 of the embodiments of the present application are not limited to be led out in the way of FIG. 2, however, the first connection line 203 may be led out from any one edge region of the first sensing unit 201, and the second connection line 204 may be led out from any one edge region of the second sensing unit 202, and the first connection line 203 and the second connection line 204 extend in the first and the second directions, respectively. Furthermore, the first connection line 203 and the second connection line 204 may be led out from other position other than the edge regions of the first sensing unit 201 and the second sensing unit 202, respectively.

The present invention is not limited to the certain structure mentioned in the first embodiment, the shape of the first sensing unit 201 and the second sensing unit 202 may be formed as polygon-shaped or irregular shape, and the first connection line 203 and the second connection line 204 may be led out from any positions of the first sensing unit 201 and the second sensing unit 202, respectively. Further, the arrangement of the first sensing unit 201 and the second sensing unit 202 may be set as required, as long as the first sensing unit 201 and the second sensing unit 202 are alternatively arranged, and the first sensing unit 201 and the second sensing unit 202 are overlapped with the first connection line 203 and the second connection line 204, respectively.

Preferably, the first sensing units 201 and the second sensing units 202 are formed of transparent electrode material, such as Indium tin oxide (ITO) or Indium zinc oxide (IZO). Of course, the present invention is not limited to that the sensing unit is formed by Indium tin oxide or Indium zinc oxide, as long as the material meets the conductive requirement and the process for manufacturing semi-conductor, and it may be used to make sensing unit.

Preferably, the first sensing units 201 and the first connection lines 203 are formed in the same layer, and the second sensing units 202 and the second connection lines 204 are formed in the same layer, whereas the first sensing units 201 and the second sensing units 202 are formed in different layers, and an insulation layer is provided between the first sensing unit 201 and the second connection line 204 overlapped with this first sensing unit 201, and a further insulation layer is provided between the second sensing unit 202 and the first connection line 203 overlapped with this second sensing unit 202. The insulation layers may be formed by silicon oxide, nitrogen oxide, chromium oxide, silicon nitrogen oxide or aluminum oxide.

Preferably, the first sensing units 201, the second sensing units 202 and the first connection lines 203 are formed in the same layer, whereas the second connection lines 204 are formed in a different layer. The second connection line 204 is connected to two adjacent second sensing units 202 in the cross-bridge manner, and an insulation layer is provided between the second connection line 204 and the first sensing unit 201 overlapped with the second connection line 204. In addition, alternatively, the first sensing unit 201, the second sensing unit 202 and the second connection lines 204 are formed in the same layer, whereas the first connection lines 203 are formed in a different layer. The first connection line 203 is connected to two adjacent first sensing units 201 in the cross-bridge manner, and an insulation layer is provided between the first connection line 203 and the second sensing unit 202 overlapped with the first connection line 203. Of course, the first connection line 203 and the second connection line 204 may also be provided to be separated from the first sensing unit 201 and the second sensing unit 202, respectively, that's to say, the first connection lines 203 and the first sensing units 201 are formed in different layers, and/or the second connection lines 204 and the second sensing units 202 are formed in different layers, and it may also be determined according to the manufacture process.

Figure 3:
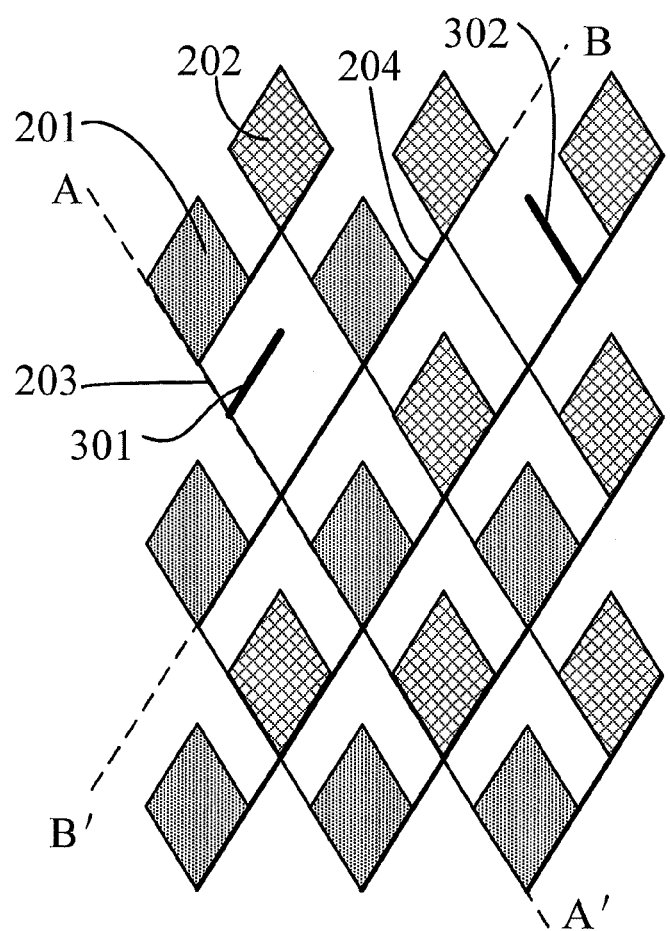
FIG. 3 is a principal schematic view of arrangement of sensing units in a touch screen according to a second embodiment of the present invention.

FIG. 3 shows a structure schematic view of a touch screen according to a second embodiment of the present invention. As shown in FIG. 3, different from the first embodiment, the first connection line 203 is further provided with many groups of first branch lines, and each group of first branch lines include at least one first branch line 301, and the at least one first branch line 301 of each group of first branch lines is overlapped with the respective second sensing unit 202 which is overlapped with the first connection line 203 (for the sake of illustration, the second sensing unit 202 overlapped with this first branch lines is not shown in FIG. 3), and the overlapping position of this first branch line is different from that of the first connection line 203. In this way, the overlapping capacitance between the first sensing unit 201 and the second sensing unit 202 can be further improved, such that the ability of anti-electrostatic damage of the overlapping portion is improved and the quality of the touch screen may be ensured.

Preferably, the second connection line 204 is also provided with many groups of first branch lines, and each group of second branch lines includes at least one second branch line 302, and the at least one second branch line 302 of each group of second branch lines is overlapped with the respective first sensing unit 201 which is overlapped with the second connection line 204 (for the sake of illustration, the first sensing unit 201 overlapped with this second branch lines is not shown in FIG. 3), and the overlapping position of this second branch line is different from that of the second connection line 204. Alternatively, the first connection line 203 and the second connection line 204 are simultaneously provided with many groups of first branch lines and many groups of second branch lines, respectively.

Preferably, the first branch line and the second branch line are led out from the first connection line 203 and the second connection line 204, respectively, and extend in the second and first directions, respectively. Further, the first branch line and the second branch line are overlapped with the edge of the second sensing unit 202 and the edge of the first sensing unit 201, respectively. Since edge region of the sensing unit tends to produces static electricity, the first branch line and the second branch line are arranged to be overlapped with the edges of the second sensing unit 202 and the first sensing unit 201 respectively, the ability of anti-static electricity is improved.

Preferably, a width of the first branch line may be less than that of the first connection line 203, and a width of the second branch line may be less than that of the second connection line 204. In this way, when the static-electricity is produced, the first branch line and the second branch line may be broken down firstly so as to make sure the integration of the first connection line 203 and the second connection line 204.

Certainly, the present invention is not limited thereto, whereas, at least one of the first branch line and the second branch line may extend in any directions, as long as the first branch line and the second branch line are overlapped with the second sensing unit 202 and the first sensing unit 201, respectively, so as to improve the overlapping capacitance between the first sensing unit 201 and the second sensing unit 202. The number and the width of at least one of the first branch line or the second branch line may be determined by the required increase of the overlapping capacitance, and the size thereof may be regulated so as to not extend beyond the second sensing unit 202 and the first sensing unit 201.

The first sensing unit 201, the second sensing unit 202, the first connection lines 203 and the second connection lines 204 are all provided on a substrate, and the back surface of the substrate is further provided with a color film substrate and an array substrate, and the structure of the color film substrate and the array substrate may be acquired from the prior art and will not be described in detail.

The touch screen is a capacitive touch screen.

The present invention further provides a display device including the above-mentioned touch screen.

Figure 4:
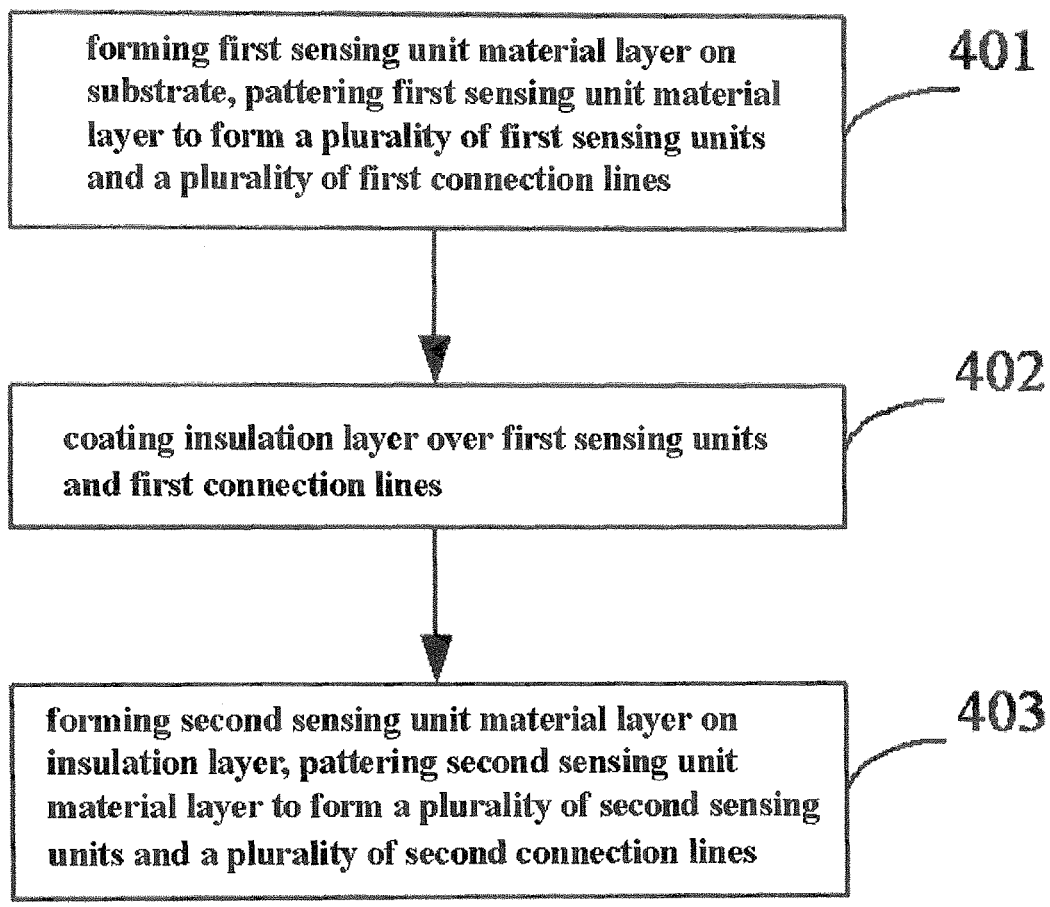
FIG. 4 is a flow chart of a method of manufacturing a touch screen according to an embodiment of the present invention.
Figure 5:
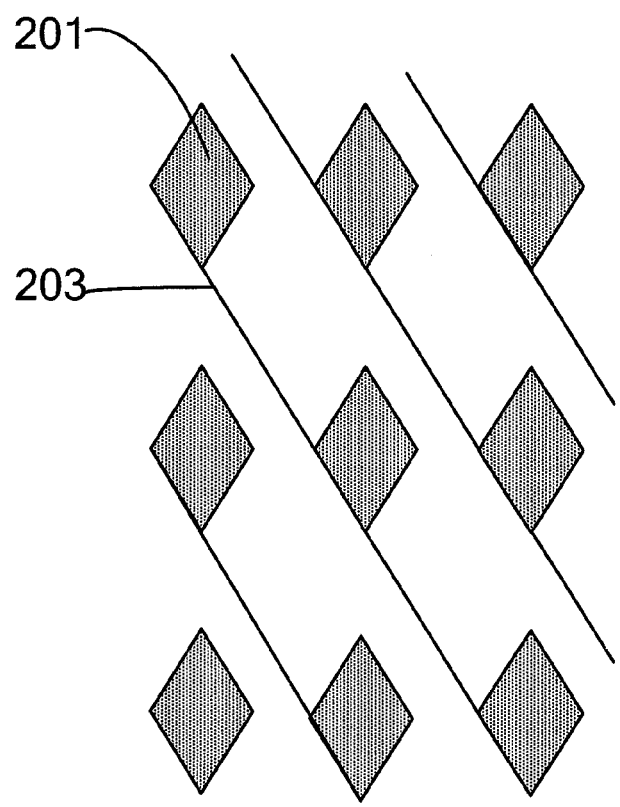
FIGS. 5(*a*)-5(*c*) are schematic views of each step of the method of manufacturing the touch screen according to an embodiment of the present invention.
Figure 5:
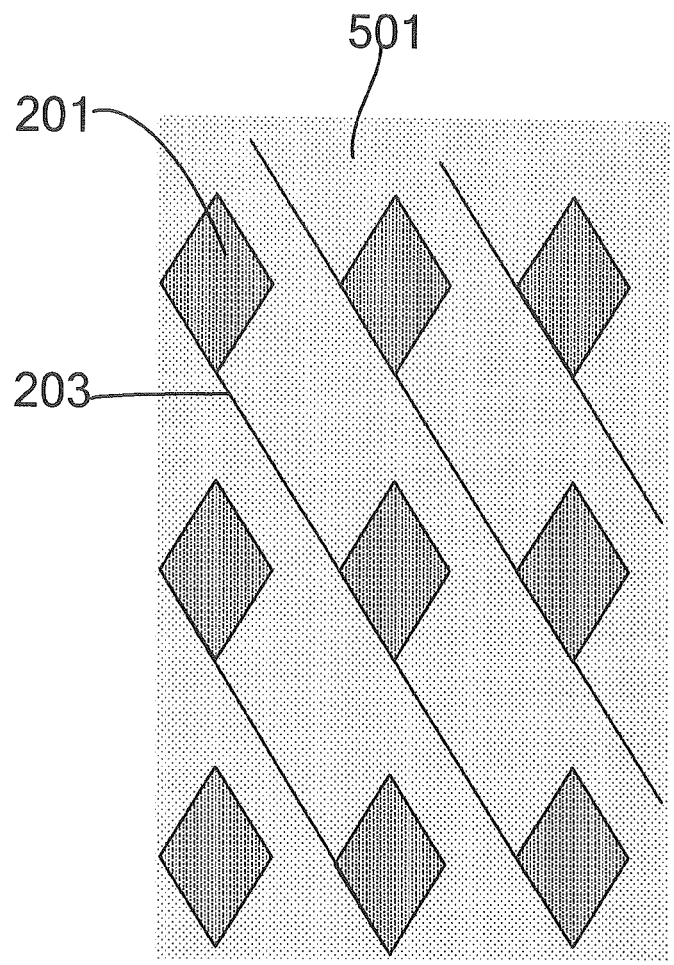
Figure 5:
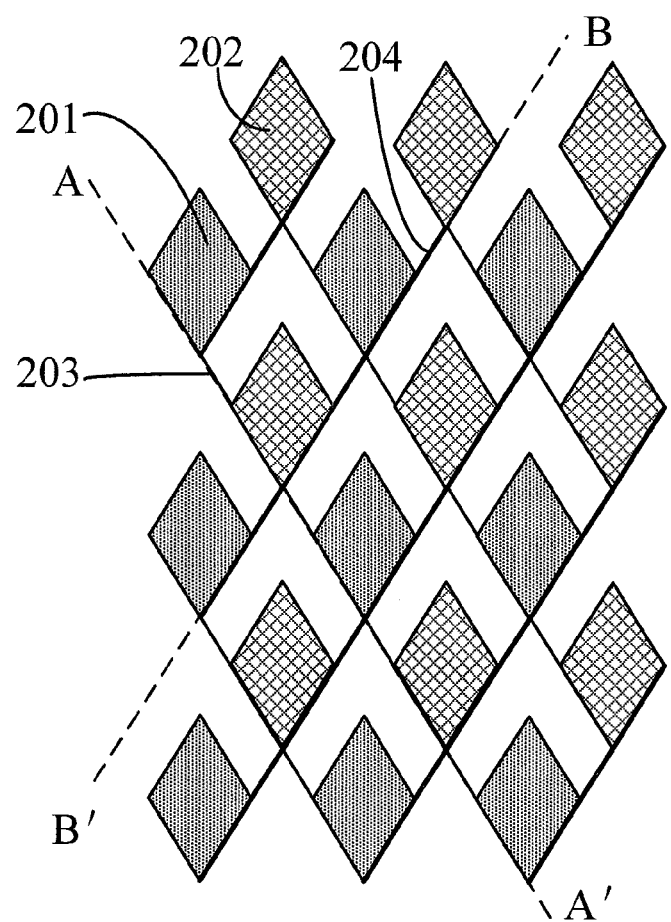

FIG. 4 is a flow chart of method of manufacturing a touch screen according to the embodiments of the present invention; and FIGS. 5(a)-5(c) are schematic view of each step of the method of manufacturing the touch screen according to an embodiment of the present invention, respectively. The present embodiment illustrates the method of manufacturing the touch screen, taking the first sensing units 201 and the second sensing units 202 formed in different layers for instance. As shown in FIGS. 4 and 5, the method comprises:

Step 401: forming a first sensing unit material layer on a substrate, pattering the first sensing unit material layer so as to form a plurality of first sensing units 201 and a plurality of first connection lines 203, and the plurality of the first sensing units 201 are arranged with intervals therebetween in a first direction and connected to each other by the first connection line 203, as shown in FIG. 5(a);

Step 402: coating an insulation layer 501 over the first sensing units 201 and the first connection lines 203, as shown in FIG. 5(b);

Step 403: forming a second sensing unit material layer on the insulation layer 501, pattering the second sensing unit material layer so as to form a plurality of second sensing units 202 and a plurality of second connection lines 204, and the plurality of the second sensing units 202 are arranged with intervals therebetween in a second direction and connected to each other by the second connection line 204, as shown in FIG. 5(c) (for the sake of clarity, the insulation layer is not shown in this figure);

Wherein, in the first direction and the second direction, the first sensing units 201 and the second sensing units 202 are alternatively arranged, and in the first direction, each second sensing units 202 is overlapped with the first connection line 203 between two first sensing units 201 adjacent to this second sensing unit 202, and in the second direction, each first sensing units 201 is overlapped with the second connection line 204 between two second sensing units 202 adjacent to this first sensing unit 201.

Further, the step 401 also comprises a step of:

a plurality of groups of first branch lines are led out from the first connection line 203, and each group of the first branch lines includes at least one first branch line, and each group of the first branch lines is formed under the respective second sensing unit 202.

Further, in the step 402, the insulation layer covers the whole substrate surface formed with the first sensing units 201 and the first connection lines 203.

Further, the step 403 also comprises a step of:

a plurality of groups of second branch lines are led out from the second connection line 204, and each group of the second branch lines includes at least one second branch line, and each group of the second branch lines is formed above the respective first sensing unit 201.

Preferably, the first branch line is led out in the second direction and overlapped with an edge of the respective second sensing unit 202; and the second branch line is led out in the first direction and overlapped with an edge of the respective first sensing unit 201.

Preferably, each group of first branch lines may comprises a plurality of, preferably two, first branch lines, which are overlapped with two parallel edges of the respective second sensing unit 202; and each group of second branch lines may comprises a plurality of, preferably two, second branch lines, which are overlapped with two parallel edges of the respective first sensing unit 201.

Certainly, the first branch line and the second branch line may extend in any directions, as long as the first branch line and the second branch line may be overlapped with the second sensing unit 202 and the first sensing unit 201, respectively, so as to improve the overlapping capacitance between the first sensing unit 201 and the second sensing unit 202. The number and the width of the first branch line or the second branch line are depended on the required increase of the overlapping capacitance, and the size thereof may be regulated so as to not extend beyond the second sensing unit 202 and the first sensing unit 201.

Preferably, the first sensing unit material layer and the second sensing unit material layer are made of material for conductive transparent electrode, such as Indium tin oxide (ITO) or Indium zinc oxide (IZO). And the first sensing unit material layer and the second sensing unit material layer may be patterned by a photolithography process and/or etching process or the like. Certainly, the present invention is not limited thereto, other common process in the prior art can be used to perform patterning process.

In other embodiment of the present invention, the first sensing units 201, the second sensing units 202 and the first connection lines 203 are formed in the same layer firstly, and then the second connection line 204 is formed in cross-bridge manner so as to connect two adjacent second sensing units 202. Certainly, the first sensing unit 201, the second sensing unit 202 and the second connection lines 204 may also be formed in the same layer firstly, and then the first connection line 203 is formed in cross-bridge manner so as to connect two adjacent first sensing units 201. The manufacturing method of the touch screen of the present invention is not limited to the steps mentioned in the above embodiments. The modifications to the manufacturing method of the above embodiment according to the design concept of the present invention and utilizing the common manufacturing means of this art should be fall into the protection scope of the present invention.

According to a further embodiment of the present invention, there is provided a display device including the touch screen according to any one of above embodiments. The display device may be a mobile phone, a panel computer, a TV, a display, a laptop, a digital picture frame, a navigator, an electronic paper and other product or component having display function. The display device may also be installed on a door, a wall, a work table and a transparent display panel of various household electrical devices.

The touch screen and the manufacturing method thereof provided by the present invention have improved the overlapping capacitance between the first sensing unit 201 and the second sensing unit 202 by the following design concept: the first connection line and the second connection line for connecting the first sensing units and the second sensing units, respectively, are arranged to be overlapped with the second sensing unit and the first sensing unit, respectively, and the overlapping area is not limited to the overlapping area between two connection lines, but the overlapping area between the connection line and the respective sensing unit, thereby avoiding the problem of electrostatic damage caused by the excessively small electrostatic capacitance and guaranteeing the quality of the touch screen.

The above detailed embodiments have further illustrated the objects, technical solutions and advantageous effect of the present invention in detail. It should be understood that the above embodiments are merely specific embodiments of the present invention and are not intended to limit the present invention. The changes, equivalent or modifications to the present invention without departing from the principles and spirit of the present invention should fall into the protection scope of the present invention.

What is claimed is:

1. A touch screen, comprising:
 a plurality of first sensing units connected to each other by a first connection line in a first direction; and
 a plurality of second sensing units connected to each other by a second connection line in a second direction,
 wherein, the first sensing units and the second sensing units are arranged alternatively in the first and second direction; and in the first direction, at least part of the second sensing units is overlapped with the first connection line between two first sensing units adjacent to this second sensing unit, and in the second direction, at least part of the first sensing units is overlapped with the second connection line between two second sensing units adjacent to this first sensing unit,
 wherein, an overlap region between the first connection line and the second sensing unit is provided in a line matching a direction of an edge of the second sensing unit, and
 an overlap region between the second connection line and the first sensing unit is provided in a line matching a direction of an edge of the first sensing unit.

2. The touch screen of claim 1, wherein, the first connection line is provided with a plurality of groups of first branch lines, each group of first branch lines including at least one first branch line, and the first branch line of each group of first branch lines being overlapped with the respective second sensing unit which is overlapped with the first connection line; and/or
 the second connection line is provided with a plurality of groups of first branch lines, each group of second branch lines including at least one second branch line, and the second branch line of each group of second branch lines being overlapped with the respective first sensing unit which is overlapped with the second connection line.

3. The touch screen of claim 2, wherein, the first branch line is led out from the first connection line and extends in the second direction; and the second branch line is led out from the second connection line and extends in the first direction.

4. The touch screen of claim 3, wherein, the first branch line is overlapped with an edge of the second sensing unit, and the second branch line is overlaps with an edge of the first sensing unit.

5. The touch screen of claim 2, wherein, the first branch line is overlapped with an edge of the second sensing unit, and the second branch line is overlapped with an edge of the second sensing unit.

6. The touch screen of claim 5, wherein, the width of the first branch line is less than that of the first connection line, and the width of the second branch line is less than that of the second connection line.

7. The touch screen of claim 2, wherein, the width of the first branch line is less than that of the first connection line, and the width of the second branch line is less than that of the second connection line.

8. The touch screen of claim 1, wherein, the first sensing units and the second sensing units both are rhombus-shaped, the first connection line is led out from a first edge of the first sensing unit, the second connection line is led out from a second edge of the second sensing unit, and the intersection angle between the first connection line and the second connection line is equal to one angle of the rhombus.

9. The touch screen of claim 1, wherein, the first sensing units and the second sensing units are formed in different layers, the first sensing units and the first connection lines are formed in the same layer, and the second sensing units and the second connection lines are formed in the same layer.

10. A display device, comprising the touch screen according to claim 1.

11. The display device of claim 10, wherein, the first connection line is provided with a plurality of groups of first branch lines, each group of first branch lines including at least one first branch line, and the first branch line of each group of first branch lines being overlapped with the respective second sensing unit which is overlapped with the first connection line; and/or the second connection line is provided with a plurality of groups of first branch lines, each group of second branch lines including at least one second branch line, and the second branch line of each group of second branch lines being overlapped with the respective first sensing unit which is overlapped with the second connection line.

12. The display device of claim 11, wherein, the first branch line is led out from the first connection line and extends in the second direction; and the second branch line is led out from the second connection line and extends in the first direction.

13. The display device of claim 11, wherein, the first branch line is overlapped with an edge of the second sensing unit, and the second branch line is overlaps with an edge of the first sensing unit.

14. The display device of claim 11, wherein, the width of the first branch line is less than that of the first connection line, and the width of the second branch line is less than that of the second connection line.

15. The display device of claim 10, wherein, the first sensing units and the second sensing units both are rhombus-shaped, the first connection line is led out from a first edge of the first sensing unit, the second connection line is led out from a second edge of the second sensing unit, and the intersection angle between the first connection line and the second connection line is equal to one angle of the rhombus.

16. A manufacturing method of a touch screen, comprising steps of:
   forming a first sensing unit material layer, and patterning the first sensing unit material layer so as to form a plurality of first sensing units and a plurality of first connection lines, the plurality of the first sensing units being connected to each other by the first connection line in a first direction;
   coating an insulation layer over the first sensing units and the first connection lines;
   forming a second sensing unit material layer, and patterning the second sensing unit material layer so as to form a plurality of second sensing units and a plurality of second connection lines, the plurality of the second sensing units being connected to each other by the second connection line in a second direction;
   wherein, in the first direction and the second direction, the first sensing units and the second sensing units are arranged alternatively; and in the first direction, at least part of the second sensing units is overlapped with the first connection line between two first sensing units adjacent to this second sensing unit, and in the second direction, at least part of the first sensing units is overlapped with the second connection line between two second sensing units adjacent to this first sensing unit;
   wherein, an overlap region between the first connection line and the second sensing unit is provided in a line matching a direction of an edge of the second sensing unit, and
   an overlap region between the second connection line and the first sensing unit is provided in a line matching a direction of an edge of the first sensing unit.

17. The method of claim 16, wherein, the step of forming the first sensing unit material layer and pattering the first sensing unit material layer comprises a step of:
   forming a plurality groups of first branch lines, each group of the first branch lines including at least one first branch line, being led out from the first connection line and formed under the respective second sensing unit.

18. The method of claim 16, wherein, the step of forming the second sensing unit material layer and pattering the second sensing unit material layer comprises a step of:
   forming a plurality of groups of second branch lines, each group of the second branch lines including at least one second branch line, being led out from the second connection line and formed under the respective first sensing unit.

\* \* \* \* \*